July 26, 1960    K. E. SNYDER    2,946,241
TRANSMISSION

Filed Aug. 5, 1957    2 Sheets-Sheet 1

INVENTOR.
Kenneth E. Snyder
BY
W. C. Middleton
ATTORNEY

INVENTOR.
Kenneth E. Snyder
BY
W. C. Middleton
ATTORNEY

United States Patent Office 2,946,241
Patented July 26, 1960

2,946,241

TRANSMISSION

Kenneth E. Snyder, Northville, Mich., assignor to General Motors Corporation, Detroit, Mich., a corporation of Delaware Filed Aug. 5, 1957, Ser. No. 676,101

16 Claims. (Cl. 74—754)

This invention relates to transmissions and particularly to improvements in controls for transmissions.

In automatic transmissions of the type incorporating plural planetary gear units, several different speed ratios can be obtained by coordinating the conditioning of each unit for either a reduced or a direct drive. If the coordination is proper then the change from one speed ratio to another will occur gradually and smoothly without noticeable perception by the vehicle operator. The timing of the instant when each unit is to commence transmission of torque and whether at a reduced or a direct drive is important and always constitutes a problem. Unless the timing is correct, the shifts will occur at the wrong times and as a result become rough and jerky.

With the foregoing in mind, the invention contemplates a control system for a transmission that is conscious of the torque being transferred therethrough and that automtically coordinates changes in speed ratios in accordance with these torques.

By the invention, a transmission control system is furnished with a torque conscious control device which reflects changes in torque loads on the transmission gear units and which becomes operative when the torque load attains a predetermined value.

Specifically, the invention furnishes a control device which coordinates the transitions of a series of transmission gear units so that, during a speed ratio change and after one unit transmits a predetermined torque, the control device becomes operative and prepares another gear unit for a drive determined by the requirements of the particular ratio change.

In transmissions which employ hydraulically operated friction engaging devices, e.g., clutches or brakes, for conditioning planetary gear units for either reduced or direct drine, wear as well as variations due to manufacturing tolerances are some of the factors to be considered in producing smooth shifts. For instance, as wear of the friction engaging surfaces, such as those of a multiple disk clutch, occurs, the clutch stroke increases and, therefore, the enging characteristics of the clutch change. Also, dimensional differences will cause a variation in the engaging characteristics of separate friction engaging devices. To explain further, if during a ratio change a first clutch is to be engaged hydraulically and a second clutch subsequently disengaged only after the engaging pressure for the first clutch attains a certain desired value, it is possible that the desired amount of engaging pressure may not be adequate, particularly when the clutches are well worn, to produce a proper engagement of the first clutch prior to commencing a disengagement of the second clutch. As a result, the shift transition becomes rough.

Accordingly, the invention seeks to provide a control device for a transmission control system that coordinates the engagement and disengagement of friction engaging devices and that automatically compensates for wear and dimensional differences to maintain a proper coordination.

By one form of the invention, a torque responsive control device is associated with a multiple disk clutch in such a manner that after engagement of the clutch has been initiated and the clutch is transmitting some predetermined torque, the control device will be actuated and pressure fluid transferred thereby to a relay valve. The relay valve is then moved to a position in which pressure fluid being supplied to another clutch is cut off and the clutch exhausted. The control device will only be actuated by the clutch at the desired torque value regardless of the wear that takes place between the disks of the clutch or the dimensional differences between different clutch packs.

The foregoing and other objects and advantages of the invention will be apparent from the following description and from the accompanying drawings in which.

Figure 1:
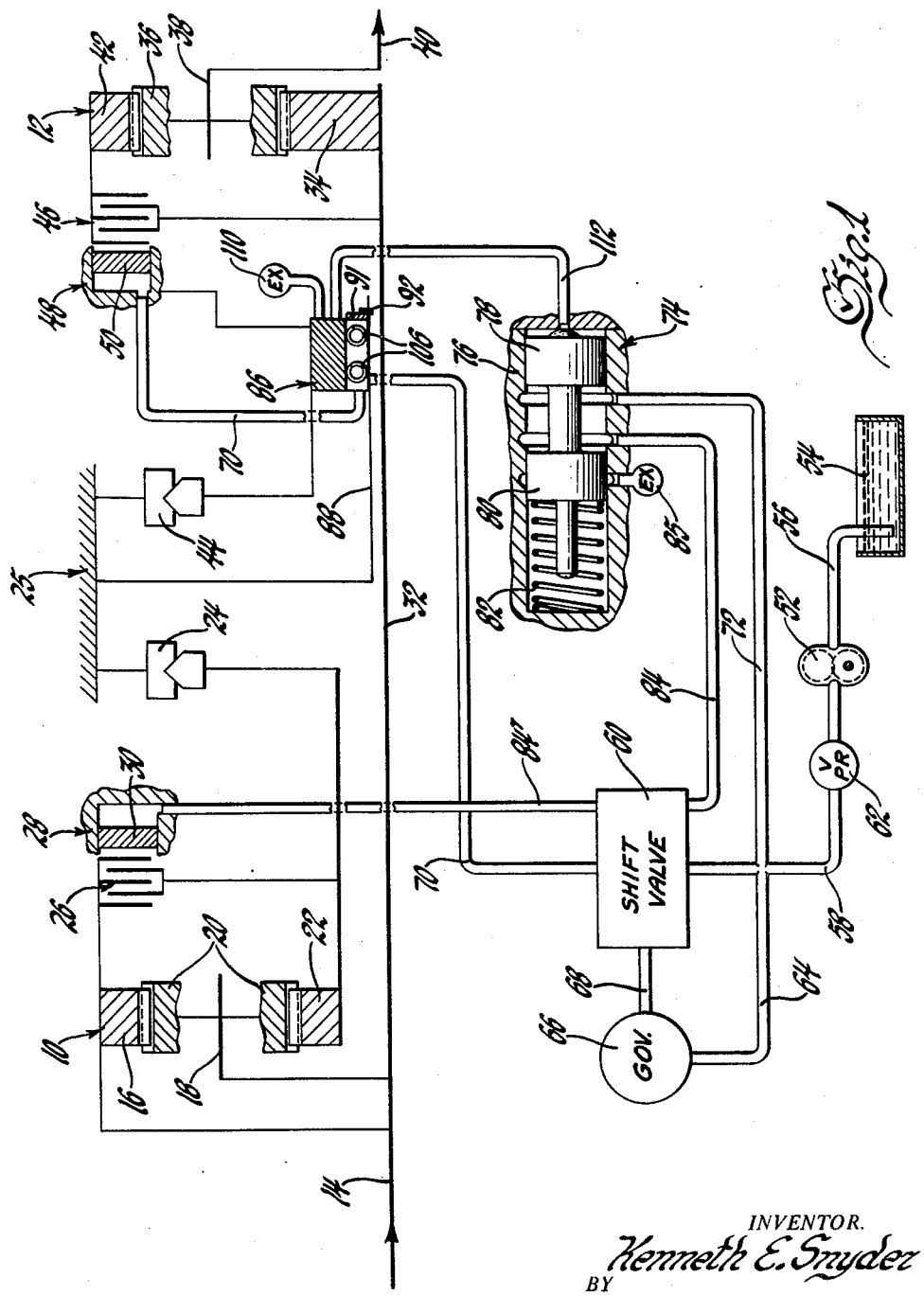
Figure 1 is a schematic diagram of a transmission and a control system therefor demonstrating the principles of the invention.

Referring to the drawings and particularly to Figure 1, a transmission is illustrated comprising a pair of planetary gearsets 10 and 12 interconnected to afford four forward speeds. An input shaft 14 for the transmission is connected to an appropriate prime mover, e.g., a vehicle engine (not shown) which furnishes drive to a ring gear 16 of the front planetary gearset 10. An output carrier 18 for the front gearset 10 has a series of planet pinions 20 journaled thereon meshing both with the input ring gear 16 and a reaction sun gear 22. A one-way brake 24 which utilizes one-way brake elements of any well known character, such as sprags or rollers, is interconnected between the sun gear 22 and the transmission casing 25 in a known manner that permits the reaction sun gear 22 to rotate forwardly unimpeded but prevents rearward movement thereof. For direct drive through the gearset 10, a clutch 26, which may be of the multiple disk type, is interposed between the ring gear 16 and the sun gear 22 and is actuated by a hydraulically operated servo 28. When pressure fluid is supplied to the servo 28, a piston 30 slidable therein compresses the disks of the clutch 26 and causes the gearset 10 to be locked up for a unitary drive whereupon the input shaft 14 will revolve at the same speed as the output carrier 18.

An intermediate shaft 32 is interconnected between the output carrier 18 and a sun gear 34 for the rear planetary gearset 12 to transfer drive therebetween. A group of planet pinions 36 are journaled on a planet carrier 38 which is connected to a transmission output shaft 40, in turn, drive connected to the vehicle wheels. The pinions 36 intermesh both with the sun gear 34 and a reaction ring gear 42. A one-way brake 44, including one-brake elements, e.g., sprags or rollers, is interposed between the casing 25 and the reaction ring gear 42 to prevent reverse rotation thereof in a manner similar to the one-way brake 24. A clutch 46, similar to clutch 26, interconnects the ring gear 42 and the sun gear 34 to afford a direct drive through the gearset 12. Engagement of the clutch 46 is effected by a hydraulically operated servo 48, including a piston 50 slidable therein.

From the foregoing with both of the clutches 26 and 46 disengaged, drive will be from the input shaft 14 to the ring gear 16 for the front planetary gearset 10. Since the reaction sun gear 22 is restrained from reverse rotation by the one-way brake 24, drive will be transferred by the output carrier 18 at a reduced speed to the sun gear 34 of the rear planetary gearset 12. The reaction ring gear 42 cannot rotate rearwardly due to the arrangement of the one-way brake 44 and, hence, drive in a forward direction is transferred to the output shaft 40 by the carrier 38 at a further reduced speed corresponding to first speed drive. Second speed is obtainable by engaging the clutch 26 while the clutch 46 remains disengaged, whereupon drive from the input shaft 14 is transferred to the intermediate shaft 32 at a direct drive ratio and then at a reduced speed determined solely by the gearset 12. In commencing third speed drive, the clutch 46 is engaged and the clutch 26 is disengaged. As a result, the front grearset 10 is set for a reduced drive equivalent to the third speed ratio, whereas the rear gearset 12 is locked up for direct drive by the clutch 46. When both of the clutches 26 and 46 are engaged, the gearsets 10 and 12 are locked up and the transmission provides a fourth speed direct drive.

As seen in Figure 1, an abbreviated control system for the transmission is depicted which shows sufficient structure for providing a second to third speed shift. Inasmuch as this particular shift best demonstrates the invention, it is believed unnecessary to provide and explain other than briefly the control details required for the other shifts, namely, the first to second and third to fourth speed shifts. Pressure fluid for the system is supplied by a pump 52 which may be driven through suitable structure (not shown) either by the input shaft 14 or the output shaft 40. When the pump 52 is operating, fluid is drawn from a sump 54 through a suction line 56 and discharged into a main supply line 58, in turn, connected to a shift valve mechanism, indicated generally at 60, which may include one or more shift valves. A conventional pressure regulating valve 62 is located in the line 58 to establish an operating pressure for the system. A branch 64 of the line 58 extends to a governor depicted generally at 66. Preferably, the governor is of the hydraulic type driven, as desired, either by the input shaft 14 or the output shaft 40 by suitable structure (not shown) and may be of the character disclosed by the Thompson Patent 2,204,872, issued January 18, 1940 for Change Speed Gearing and Control. The governor 66, in operation produces a speed conscious pressure fluid which is transported by the line 68 to the shift valve mechanism 60. When the shift valve mechanism 60 is operated by this speed conscious pressure fluid, pressure fluid is transferred from the line 58 to a line 70 connected to the servo 48 for the clutch 46.

Another branch 72 of the line 58 extends to a relay valve designated at 74. The relay valve 74 is slidable in a bore in a valve body 76 and comprises spaced lands 78 and 80. A spring 82 urges the relay valve 74 to the position depicted wherein communication between ports connected to the line 72 and a line 84 is established. Pressure fluid then can proceed from the line 72 through line 84, the shift valve mechanism 60, and a line 84' to the servo 28 for operating clutch 26. When the relay valve 74 is shifted to the left by fluid pressure, in a way to be explained, the lands 78 and 80 interrupt communication between ports connected to lines 72 and 84 and establish communication between the port connected to lines 84, 84' and an exhaust port 85, hence, disengaging clutch 26.

Figure 2:
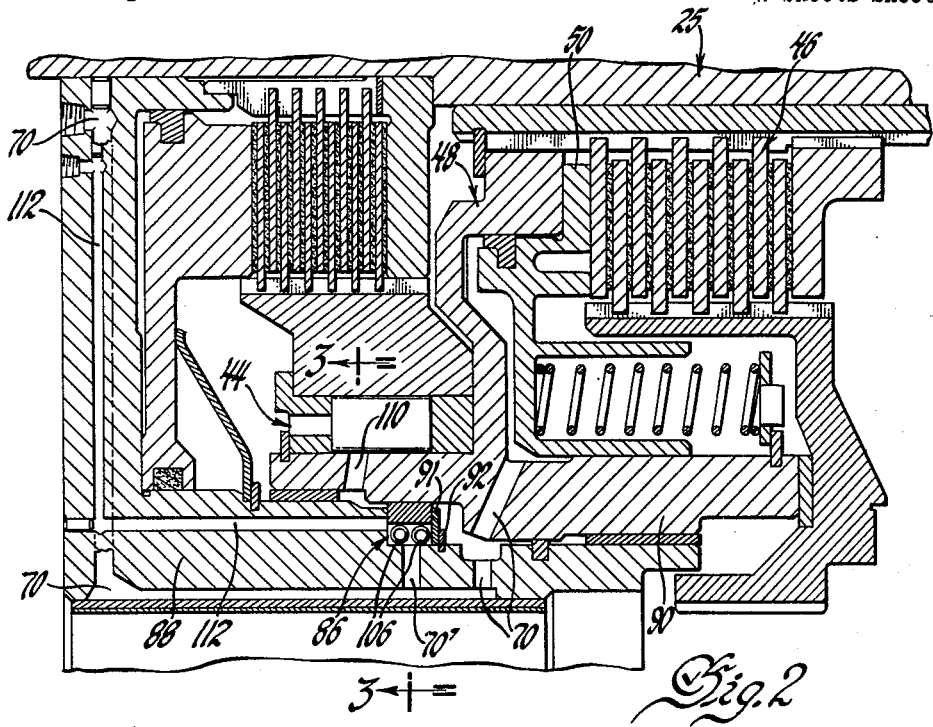
Figure 2 is a sectional view of a specific embodiment of a control device for the transmission.
Figure 3:
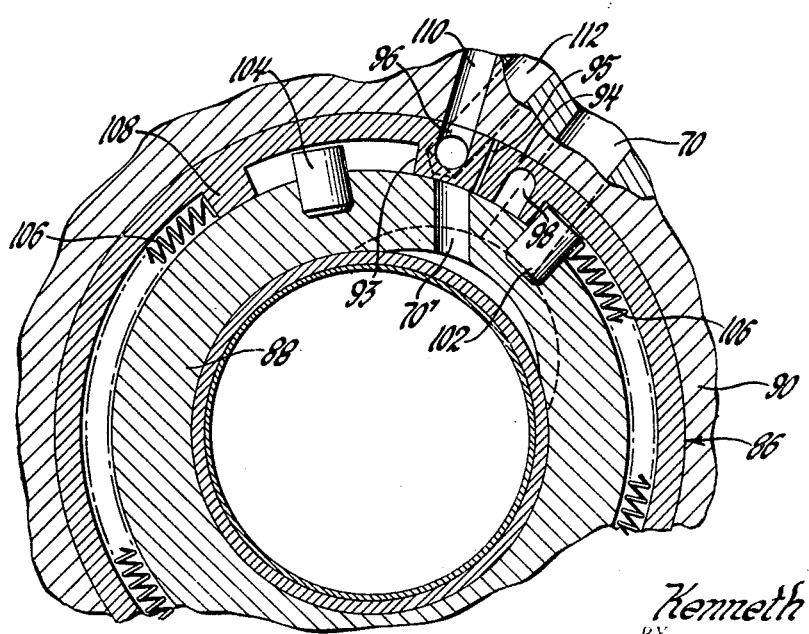
Figure 3 is a sectional view of the device taken along lines 3—3 of Figure 2.

Control of the relay valve 74 is accomplished by a ring valve shown generally at 86 which is positioned in the line 70 between the shift valve mechanism 60 and the servo 48 for the clutch 46. With reference to Figures 2 and 3, a working embodiment of the ring valve 86 is demonstrated wherein the ring valve is interposed between a stationary fluid transfer member 88 and a rotatable drum 90. Drum 90 is connected to the ring gear 42 and also acts as an inner race for the one-way brake elements of the one-way brake 44. The ring valve 86 is axially positioned on the stationary member 88 by an annular plate 91 and a retaining ring 92. As best seen in Figure 3, the ring valve has spaced adjacent projections 93 and 94 separated by a split or gap 95 therebetween. A recessed transfer passage 96 is afforded in the side of the projection 93 and opens radially outwardly, whereas the projection 94 has a similar recessed transfer passage 98 opening radially inwardly. A pair of spaced dowels 102 and 104 afford abutments on the transfer member 88 with the dowel 102 providing a stop for one end of garter type springs 106 located between the inner periphery of the ring valve 86 and the outer adjacent periphery of the transfer member 88. These springs 106 exert a bias between the dowel 102 and a projection 108 on the ring valve urging the ring valve to the position illustrated in which communication is established by the transfer passage 96 between an exhaust passage 110 and a line 112 to the relay valve 74. The other transfer passage 98 is ineffective in this position; however, pressure fluid still is permitted to proceed through the line 70 to the clutch piston 50. This same pressure fluid in line 70 also proceeds through a passage 70' and acts on the inner periphery of the ring valve 86 exerting a radially outward bias. In addition, the garter springs 106 exert a radially outward bias which combined with the fluid pressure bias causes the outer periphery of the ring valve 86 to frictionally engage the adjacent surface of the rotatable drum 90. When the ring valve 86 is rotated, in a manner to be described, counterclockwise relative to the transfer member 88, as viewed in Figure 3, the projection 93 will engage the dowel 104 and the garter springs 106 will be further compressed. With the ring valve 86 now in this position the transfer passage 96 will have moved beyond the exhaust passage 110 interrupting communication with the line 112. Transfer passage 98 will be aligned with line 112 and establish communication between the passage 70' and line 112 for supplying pressure fluid to the relay valve 74. When the projection 93 on the ring valve 86 engages the dowel 104, the compression effect on the springs 106 causes the gap 95 to be closed so that the outer diameter of the ring valve is decreased sufficiently to move out of frictional engagement with the complementary surface of the rotatable drum 90. This action prevents any drag that would cause heat and wear when the drum 90 rotates forwards.

As mentioned during the operational summary of the transmission, only the clutch 26 is engaged during a first to second speed shift. This shift is accomplished by the coaction of the governor 66 which at an appropriate speed provides ample governor pressure to the line 68 and the shift valve mechanism 60 which is actuated by the governor pressure in line 68. With the shift valve mechanism 60 so actuated, communication is established therethrough between lines 84 and 84' to the servo 28 whereupon the clutch 26 is engaged. During the shift, relay valve 74 is in the Figure 1 position and, consequently, permits transfer of pressure fluid from the pump 52 through lines 58, 72 and 84 to the shift valve mechanism 60.

During a second to third shift, the clutch 46 is engaged and the clutch 26 is disengaged as previously specified. For this transition to take place smoothly there should be a proper overlap, i.e., the clutch 46 should be partially engaged before the clutch 26 is disengaged insuring against the occurrence of a run-a-way sensation resulting when the engine speed is allowed to increase excessively. Although this change may take place at some predetermined clutch apply pressure, preferably, clutch torque should be determinative. For, as will be seen, with torque as the controlling factor, wear of the clutch is automatically compensated. Otherwise, in an extreme case, as the clutch wears and the engaging characteristics of the clutch, accordingly, change, the second to third shift transition may commence, with a well worn clutch, at the desired clutch apply pressure, but, due to this excessive wear, the fixed pressure is not sufficient to even afford a partial engagement of the clutch 46. Therefore, the slipping sensation resulting from an excessive engine speed up follows.

To start the second to third shift, the governor 66 will at some predetermined speed develop a pressure sufficient to actuate the shift valve mechanism 60 and cause pressure fluid to be transferred through the line 70 to the servo 48. The piston 50 then will start to engage the clutch 46 by compressing the disks thereof. As this clutch engages, the backward rotating tendency of the ring gear 42 will cease and it will start to rotate in a forward direction, carrying with it the rotatable drum 90 which is allowed by the one-way brake 44. Since the ring valve 86 has its outer periphery in frictional engagement with the drum 90, the ring valve will be carried with the drum 90 in the forward direction until the projection 93 on the ring valve engages the dowel 104 on the transfer member 88'. The line 112 to the relay valve 74 will no longer be open to the exhaust passage 110, and the line 70 will be opened via passage 70', transfer passage 98 in the projection 94 to the line 112. Pressure fluid will be transported to and act on the end of the land 78, and urge the relay valve in opposition to the spring 82 to the left. The pressure fluid in the line 84 for engaging the clutch 26 will be drained out of the exhaust port 85 and the clutch 26 will be disengaged.

As can be seen, the gearset 10, specifically, the gear 42 must be transmitting some predetermined torque sufficient to rotate the drum 90 in a forward direction and operate the ring valve 86. This predetermined torque, of course, can be varied but will determine when the second to third shift transition is to occur despite wear of the clutch 46 because the clutch 46 must be transmitting a certain torque before the clutch 26 is released. As a consequence, the aforementioned extreme case cannot occur, for the clutch apply pressure must be ample for clutch 46 to transmit the desired torque. Also, the variations in engaging characteristics of different clutch packs due to manufacturing tolerances does not effect the transition.

To make a third to fourth speed shift, the clutch 26 must be re-engaged which may be accomplished by the shift valve mechanism 60. At the proper speed determined by the governor 66 the shift valve mechanism 60 is suitably arranged to be actuated by governor pressure and establish communication between lines 58 and 84'. Inasmuch as the relay valve 74 is positioned to drain line 84 to exhaust port 85, pressure fluid from the pump 52 will proceed directly through the shift valve mechanism 60 and engage clutch 26.

The invention is to be limited only by the following claims.

I claim:

1. In a transmission, a gear train, first and secondary hydraulically actuated friction engaging devices for conditioning the gear train for transfer of torque therethrough, a source of fluid under pressure for applying the second friction engaging device, control valve means actuated by a predetermined torque transferred by the second friction engaging device during initial application thereof, and fluid pressure actuated valve means operated by fluid pressure supplied from the control valve means when the second friction engaging device is transferring the predetermined torque for controlling the operation of the first friction engaging device.

2. In a transmission, a gear train, first and second hydraulically actuated friction engaging devices for conditioning the gear train for transfer of torque therethrough, a source of fluid pressure for applying the second friction engaging device, means for supplying pressure fluid from the source to the first friction engaging device, and a control device operated by the torque transferred by the second friction engaging device during initial application thereof thereby causing the means for supplying pressure fluid to the first friction engaging device to interrupt the supply of pressure fluid thereto.

3. In a transmission, a gear train, first and second hydraulically actuated friction engaging devices for conditioning the gear train for transfer of torque therethrough, a source of fluid under pressure, means for supplying pressure fluid from the source to apply the second friction engaging device, a relay valve between the source of fluid pressure and the first friction engaging device for controlling the supply of pressure fluid thereto, and a control valve operated by the torque transferred by the second friction engaging device during initial application thereof, the control valve upon transfer of a predetermined torque by the second friction engaging device being actuated to an operative position in which pressure fluid is transferred from the second friction engaging device to the relay valve causing the relay valve to interrupt the supply of pressure fluid to the first friction engaging device.

4. In a transmission, a gear train, first and second hydraulically actuated friction engaging devices for conditioning the gear train for transfer of torque therethrough, a source of fluid pressure, a shift valve for supplying pressure fluid from the source to apply the second friction engaging device, a relay valve between the source and the first friction engaging device for controlling the supply of pressure fluid thereto, a control valve disposed between the shift valve and the second friction engaging device and operated by the torque transferred during initial application of the second friction engaging device, the control valve upon transfer of a predetermined torque by the second friction engaging device being actuated to supply pressure fluid from the second friction engaging device to the relay valve causing the relay valve to interrupt the supply of pressure fluid to the first friction engaging device.

5. In a transmission, a gear train, first and second hydraulically actuated friction engaging devices for conditioning the gear train for transfer of torque therethrough, a source of fluid under pressure, a shift valve for supplying a pressure fluid from the source to apply the second friction engaging device, a relay valve between the source and the first friction engaging device for controlling the supply of pressure fluid thereto, a rotary control valve between the shift valve and the first friction engaging device revolvable thereby upon transfer of a predetermined torque, the rotary control valve including a transfer passage therein for conducting pressure fluid in the operative position thereof from the second friction engaging device to the relay valve causing the relay valve to interrupt the supply of pressure fluid to the second friction engaging device.

6. A torque responsive control device for fluid pressure comprising, in combination, torque producing means, a fluid transfer member including inlet and outlet passages therein, a rotatable member in drive relation with the torque producing means, a control valve concentrically interposed between the rotatable and fluid transfer members and having a releasable frictional connection with the rotatable member, the control valve being revolvable between first and second positions by the rotatable member and so constructed as to align and establish communication between the inlet and outlet passages in the second position thereof, and means preventing rotation of the control valve beyond the second position when a predetermined torque is applied to the rotatable member thereby causing the frictional connection to be interrupted.

7. A torque responsive control device for fluid pressure comprising, in combination, torque producing means, a fluid transfer member including inlet and outlet passages therein, a rotatable member in drive relation with the torque producing means, and a control valve concentrically interposed between the rotatable and fluid transfer members and in frictional engagement with the rotatable member, biasing means for resisting rotary movement of the control valve, the control valve being revolvable by the rotatable member and so constructed as to align and establish communication between the inlet and outlet passages when a predetermined torque, adequate to overcome the opposition from the biasing means, is applied to the rotatable member.

8. A torque responsive control device for pressure fluid, comprising, in combination, torque producing means, a fluid transfer member including inlet and outlet passages therein, a rotatable member in drive rotation with the torque producing means, a ring valve concentrically interposed between the rotatable and fluid transfer members and including an inner periphery exposed to pressure fluid from the inlet passage in the transfer member and an outer periphery urged into frictional engagement with the rotatable member by the pressure fluid, the ring valve being revolvable by the rotatable member at a predetermined torque from an inoperative position in which pressure fluid communication between the inlet and outlet passages is interrupted to an operative position in which pressure fluid communication between the inlet and outlet passages is established.

9. A torque responsive control device for pressure fluid comprising, in combination, torque producing means, a fluid transfer member including inlet and outlet passages therein, a rotatable member in drive relation with the torque producing means, a ring valve concentrically interposed between the rotatable and fluid transfer members and including an inner periphery exposed to pressure fluid from the inlet passage in the transfer member and an outer periphery urged into frictional engagement with the rotatable member by the pressure fluid, the ring valve being revolvable by the rotatable member at a predetermined torque from an inoperative position in which pressure fluid communication between the inlet and outlet passages is interrupted to an operative position in which pressure fluid communication between the inlet and outlet passages is established, and biasing means urging the ring valve to the inoperative position.

10. A torque responsive control device for pressure fluid comprising, in combination, torque producing means, a fluid transfer member including inlet and outlet passages therein, a rotatable member in drive relation with the torque producing means, a ring valve concentrically interposed between the rotatable and fluid transfer members and including an inner periphery exposed to pressure fluid from the inlet passage in the transfer member and an outer periphery urged into frictional engagement with the rotatable member by the pressure fluid, the ring valve being revolvable by the rotatable member at a predetermined torque from an inoperative position in which pressure fluid communication between the inlet and outlet passages is interrupted to an operative position in which pressure fluid communication between the inlet and outlet passages is established, biasing means urging the ring valve to the inoperative position, and means for releasing the frictional engagement between the ring valve and the rotatable member when the ring valve is in the operative position.

11. A torque responsive control device for pressure fluid comprising, in combination, torque producing means, a fluid transfer member including inlet and outlet passages therein, spaced abutments on the fluid transfer member, a rotatable member in drive relation with the torque producing means, a ring valve concentrically interposed between the rotatable and fluid transfer members, the ring valve including a gap therein and projections on each side of the gap, biasing means urging the ring valve to an inoperative position in which one of the projections on the ring valve engages one of the abutments on the fluid transfer member and in which position communication between the inlet and outlet passages is interrupted, means for urging the ring valve into frictional engagement with the rotatable member, the ring valve being revolvable by the rotatable member at a predetermined torque to an operative position in which the other of said projections engages the other of said abutments and in which position communication between the inlet and outlet passages is established, the ring valve being compressed in the operative position to close the gap therein to release the frictional engagement between the ring valve and the rotatable member.

12. A torque responsive control device for fluid pressure, comprising, in combination, torque producing means; a fluid transfer member including inlet and outlet passages therein; spaced abutments on the fluid transfer member; a rotatable member in drive relation with the torque producing means; a ring valve concentrically interposed between the rotatable and fluid transfer members; the ring valve including a gap therein, projections on each side of the gap and transfer passages along the sides of each of the projections; an exhaust passage; biasing means urging the ring valve to an inoperative position in which one of the projections on the ring valve engages one of the abutments on the transfer member and in which position communication is established between the outlet and exhaust passages by one of the transfer passages; means for urging the ring valve into frictional engagement with the rotatable member, the ring valve being revolvable by the rotatable member at a predetermined torque to an operative position in which the other of said projections engages the other of said abutments and in which position communication is established between the inlet and outlet passages by the other of said transfer passages and communication between the outlet and exhaust passages is interrupted; the ring valve being compressed in the operative position closing the gap therein to release frictional engagement between the ring valve and the rotatable member.

13. In a transmission, driving and driven shafts, first and second planetary gearsets each including input, output and reaction elements, the first gearset input element being connected to the driving shaft and the second gearset output element being connected to the driven shaft, the first gearset output element being connected to the second gearset input element, a hydraulically operated clutch for each gearset for establishing a direct drive therethrough, a brake for each of the reaction elements, a source of fluid under pressure, a shift valve for supplying pressure fluid from the source to engage the second gearset clutch, a relay valve between the source and the first gearset clutch for controlling the supply of pressure fluid thereto, a control valve disposed between the shift valve and the second gearset clutch and operated by the torque transferred thereby during initial engagement thereof, the control valve upon transfer of a predetermined torque by the second gearset clutch being actuated to supply pressure fluid from the second gearset clutch to the relay valve causing the relay valve to interrupt the supply of pressure fluid to the clutch for the first gearset.

14. In a transmission; driving and driven shafts; first and second planetary gearsets each including input, output and reaction elements; the first gearset input element being connected to the driving shaft and the second gearset output element being connected to the driven shaft; the first gearset output element being connected to the second gearset input element; a hydraulically operated clutch for each gearset for establishing a direct drive therethrough, a brake for each of the reaction elements, a source of fluid under pressure; a shift valve for supplying pressure fluid from the source to engage the second gearset clutch; a relay valve between the source and the first gearset clutch for controlling the supply of pressure fluid thereto; a torque responsive control device between the shift valve and the second gearset clutch; the control device comprising, a fluid transfer member including inlet and outlet passages therein, a rotatable member connected to the second gearset clutch and a ring valve concentrically interposed between the rotatable and the fluid transfer members and in frictional engagement with the rotatable member, the ring valve being revolvable by the rotatable member upon transfer of a predetermined torque by the second gearset clutch to establish communication between the inlet and outlet passages causing the relay valve to interrupt the supply of pressure fluid to the first gearset clutch.

15. In a transmission; driving and driven shafts; first and second planetary gearsets each including input, output and reaction elements; the first gearset input element being connected to the driving shaft and the second gearset output element being connected to the driven shaft; the first gearset output element being connected to the second gearset input element; a hydraulically operated clutch for each gearset for establishing a direct drive therethrough; a brake for each of the reaction elements; a source of fluid under pressure; a shift valve for supplying pressure fluid from the source for engaging the second gearset clutch; a relay valve between the source and a first gearset clutch for controlling the supply of pressure fluid thereto; a torque responsive control device between the shift valve and the second gearset clutch; the torque responsive control device comprising, a fluid transfer member, including an inlet passage connected to the shift valve and an outlet passage connected to the relay valve, a rotatable member in drive relation with the second gearset clutch, a ring valve concentrically interposed between the rotatable and fluid transfer members and including an innner periphery exposed to pressure fluid from the inlet passage and an outer periphery urged into frictional engagement with the rotatable member by the pressure fluid, the ring valve being revolvable by the rotatable member upon transfer of a predetermined torque by the second gearset clutch from an inoperative position in which pressure fluid communication between the inlet and outlet passages is interrupted to an operative position in which pressure fluid communication between the inlet and outlet passages is established causing the relay valve to be actuated and interrupt the supply of pressure fluid to the first gearset clutch.

16. In a transmission; driving and driven shafts; first and second planetary gearsets each including input, output and reaction elements; the first gearset input element being connected to the driving shaft and the second gearset output element being connected to the driven shaft; the first gearset output element being connnected to the second gearset input element; a hydraulically operated clutch for each gearset for establishing a direct drive therethrough; a brake for each of the reaction elements; the brake for the second gearset reaction element permitting unidirectional rotation only; a source of fluid under pressure; a shift valve for supplying pressure fluid from the source to the second gearset clutch; a relay valve between the source and the first gearset clutch for controlling the supply of pressure fluid thereto; a torque responsive control device between the shift valve and the second gearset clutch; the torque responsive control device comprising, a fluid transfer member including an inlet passage connected to the shift valve and an outlet passage connected to the relay valve, spaced abutments on the fluid transfer member, a rotatable member interconnected between the one-way brake and the second gearset clutch, a ring valve concentrically interposed between the rotatable and fluid transfer members, the ring valve including a gap therein, projections on each side of the gap, and transfer passages along the sides of each projection, an exhaust passage, biasing means urging the ring valve to an inoperative position in which one of the projections on the ring valve engages one of the abutments on the transfer member and in which position communication is established between the outlet and exhaust passages by one of the transfer passages, means for urging the ring valve into frictional engagement with the rotatable member, the ring valve being revolvable by the rotatable member upon transfer of the predetermined torque by the second gearset clutch in a direction permitted by the one-way brake to an operative position in which the other of said projections engages the other of said abutments and communication is established between the inlet and outlet passages by the other of said transfer passages to operate the relay valve and interrupt the supply of pressure fluid to the first gearset clutch, the ring valve being compressed in the operative position closing the gap therein to release frictional engagement between the ring valve and the rotatable member.

References Cited in the file of this patent
UNITED STATES PATENTS

| | | |
|---|---|---|
| 2,245,857 | Hale | June 17, 1941 |
| 2,461,001 | Polen | Feb. 8, 1949 |
| 2,818,708 | Kelley | Jan. 7, 1958 |

UNITED STATES PATENT OFFICE
CERTIFICATE OF CORRECTION

July 26, 1960

Patent No. 2,946,241

Kenneth E. Snyder

It is hereby certified that error appears in the printed specification of the above numbered patent requiring correction and that the said Letters Patent should read as corrected below.

Column 1, line 49, for "drine" read -- drive --; line 54, for "enging" read -- engaging --; column 3, line 10, for "grearset" read -- gearset --; column 5, line 11, for "88'" read -- 88 --.

Signed and sealed this 4th day of April 1961.

(SEAL)
Attest: ERNEST W. SWIDER
XXXXXXXXXX
Attesting Officer

ARTHUR W. CROCKER
Acting Commissioner of Patents